US006648648B1

(12) United States Patent
O'Connell

(10) Patent No.: US 6,648,648 B1
(45) Date of Patent: Nov. 18, 2003

(54) INSTRUCTIONAL MATHEMATICS BOARD GAME

(76) Inventor: Elena O'Connell, 3636 Smith St., Wantagh, NY (US) 11793

( * ) Notice: Subject to any disclaimer, the term of this patent is extended or adjusted under 35 U.S.C. 154(b) by 0 days.

(21) Appl. No.: 10/154,174

(22) Filed: May 23, 2002

(51) Int. Cl.⁷ .................. G09B 19/02; G09B 19/22; A63F 3/00
(52) U.S. Cl. .................. 434/188; 434/191; 434/128; 434/129; 273/236; 273/302; 273/430; 273/431; 273/242
(58) Field of Search ................. 434/128, 129, 434/191, 188; 273/256, 236, 302, 430, 431, 242

(56) References Cited

U.S. PATENT DOCUMENTS

| | | | |
|---|---|---|---|
| 1,604,846 A | | 10/1926 | Nelson |
| 3,104,106 A | | 9/1963 | Kenney et al. |
| 4,109,918 A | * | 8/1978 | Mele et al. .................. 273/256 |
| 4,557,485 A | * | 12/1985 | Lardon .................. 273/249 |
| 5,102,339 A | * | 4/1992 | Parriera .................. 434/191 |
| 5,242,171 A | | 9/1993 | Hata |
| 5,318,447 A | | 6/1994 | Mooney |
| 5,679,002 A | | 10/1997 | Scelzo |
| 5,782,471 A | | 7/1998 | Bautista et al. |
| 5,906,371 A | * | 5/1999 | Peterson .................. 273/249 |
| 6,106,300 A | | 8/2000 | Kiyosaki et al. |
| 6,308,955 B1 | | 10/2001 | Slatter |

* cited by examiner

*Primary Examiner*—Derris H. Banks
*Assistant Examiner*—Dmitry Suhol
(74) *Attorney, Agent, or Firm*—Collard & Roe, P.C.

(57) ABSTRACT

An educational game for teaching mathematics has a game board with a continuous play path along its edge. Spaces are labeled with a mathematical category and a monetary amount. Each mathematical category has its own deck of cards with questions, answers and explanations. At least one of the spaces of the game board is labeled with the help category. When a player lands on this space they receive a help card, which permits that player to ask another player for help in solving a question. The game is played by moving a marker along the play path. If the marker stops on a space that has a mathematical category the player selects corresponding card. If the player's solution to the question and answer on the card match the player collects play money in the amount printed on the space. If not, play proceeds to the next player and the first player continues to work on the question, giving that player the ability to self-correct. All solutions may be collected as an assignment by a teacher in a classroom setting. The first player to accumulate a specified amount of play money is the winner.

15 Claims, 2 Drawing Sheets

INSTRUCTIONAL MATHEMATICS BOARD GAME

BACKGROUND

The invention relates to an apparatus and a method for playing an instructional mathematics board game. The game enables players to gain an understanding of several mathematical concepts while fostering helpfulness among players and self-corrective behavior.

Various board games have been created for educational and amusement purposes. Mathematical games have been utilized in the following references: U.S. Pat. No. 5,318,477 to Mooney discloses a multiplication square game and method; U.S. Pat. No. 5,679,002 to Scelzo discloses a fractional-arithmetic-teaching game and method for playing; U.S. Pat. No. 6,308,955 to Slatter discloses a mathematical board game that teaches the four basic formats of mathematics; U.S. Pat. No. 5,782,471 to Bautista discloses a board game apparatus and method of play for teaching basic arithmetic and mathematical operations to small children.

SUMMARY

The invention relates to an educational game for teaching mathematics that has a game board with a continuous play path along its edge. The play path is divided into contiguous spaces. A majority of these spaces are labeled with a mathematical category and a monetary amount. The mathematical category may be addition, subtraction, multiplication, division, money, story problems, fractions, or time.

Each mathematical category has its own deck of cards. Each deck contains question/answer cards having a question, an answer, and an explanation relating to the mathematical category of that deck. The answer and the explanation are hidden from the view of the player until the player manipulates the card in a certain way. This manipulation may involve flipping the card over or moving a blocking card that is coupled to the question/answer card.

The game also has game markers for identifying a player and marking that player's location along the play path of the game board. A random number generation means or number generator such as a die or dice determines the number of spaces a player's marker moves during play. Play money is distributed to a player for correctly solving a question from the question/answer card. The amount of money is determined by the monetary amount printed on the space on which the player's marker is situated.

At least one of the spaces of the game board is labeled with the help category. If a player lands on this space, he/she receives a help card. This card permits that player to ask another player for help in solving a question from a question/answer card.

The game is played by assigning a marker to each player and having a first player roll the die. The player then moves their marker the amount of spaces indicated on the die. If the marker stops on a space that has a mathematical category, the player selects a question/answer card from the deck relating to that mathematical category.

The player then reads the question from the question/answer card and works on a solution to the question in a notebook, eventually offering an initial solution to the question. The player then manipulates the card by flipping it over or moving the blocking card to reveals the answer printed on the question/answer card.

If the solution and answer match, the player collects play money in the amount printed on the space, and play proceeds to the next player. If the solution and answer do not match, play simply proceeds to the next player. However, the first player continues to work on the question in his/her notebook until they reach a solution that matches the answer on the card. When this board game is used in a classroom setting, the solutions may be collected by the teacher for grading purposes. Permitting a player to continue to work on a question after their turn, encourages self-corrective behavior without negatively affecting a potential grade.

If a player's marker stops on a space labeled with the help category, that player takes a card from the help card deck. If the player is unable to answer a question on their own, the help card may be used to ask another player for help in solving the question.

The first player to accumulate a specified amount of play money is the winner.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION

Figure 1:
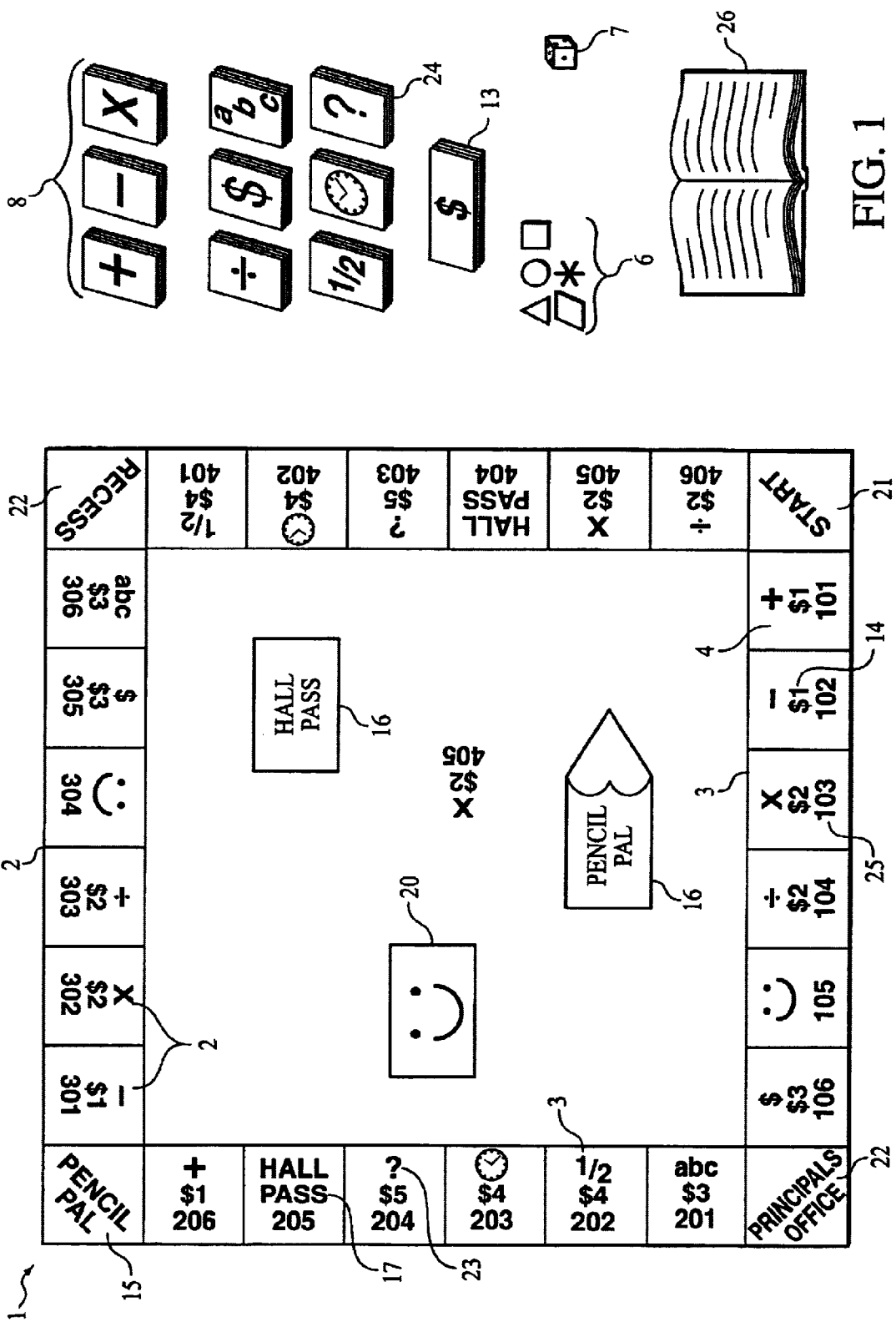
FIG. 1 is a top view of the game board, also illustrating five playing tokens, the die, play money, various decks of cards, and a notebook.

Referring now in detail to the drawings, FIG. 1 shows a an educational game 1 for teaching mathematics, having a game board 2. Game board 2 has a continuous play path 3 divided into a plurality of contiguous spaces 4. Contiguous spaces 4 preferably travel around the edge of game board 2. A majority of spaces 4 are labeled with a single mathematical category 5 and a monetary amount 14. Mathematical category 5 may be addition, subtraction, multiplication, division, money, story problems, fractions, or time.

Educational game 1 also has individual game markers 6, each of which identifies a player and marks that player's location along play path 3 of game board 2. A random number generator, or generation means 7 such as a die or pair of dice determines the number of spaces marker 6 moves during play.

Figure 2A:
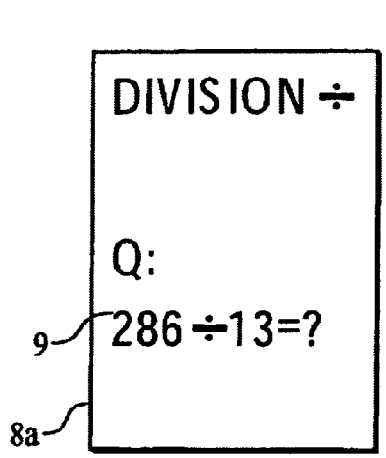
FIG. 2a is a front view of a first embodiment of a question/answer card.
Figure 2B:
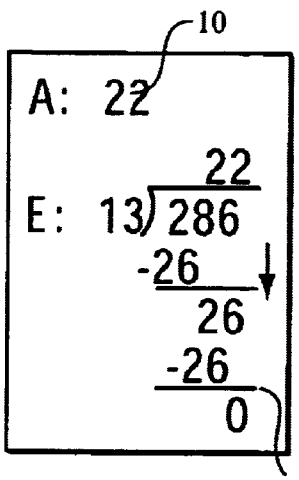
FIG. 2b is a back view of a first embodiment of a question/answer card.
Figure 2C:
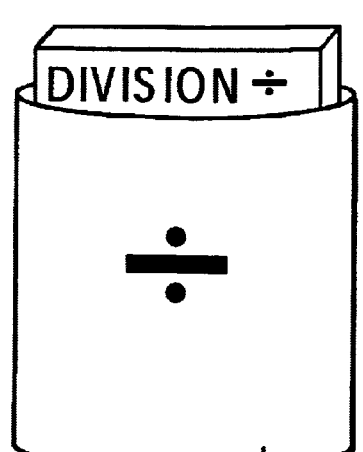
FIG. 2c is a front view of the deck of cards in a holding envelope.

Each mathematical category 5 has its own card deck 8, composed of question/answer cards 8a. FIGS. 2a–2c show question/answer cards 8a having a question 9, an answer 10, and an explanation 12 relating to mathematical category 5. Question 9 cannot be seen by the player until question/answer card 8a is picked up. Answer 10 and explanation 11 cannot be seen by the player until the card is manipulated by the player to reveal the answer. This manipulation involves flipping question/answer card 8a over in the embodiment shown in FIGS. 2a–2c. Each deck 8 of question/answer cards 8a is stored in its own envelope 28 so that questions 9 are not viewed until question/answer card 8a is removed.

Figure 3A:
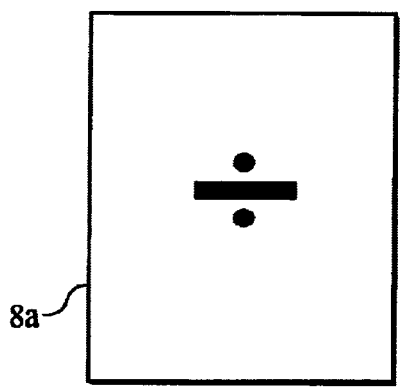
FIG. 3a is a front view of a second embodiment of a question/answer card.
Figure 4A:
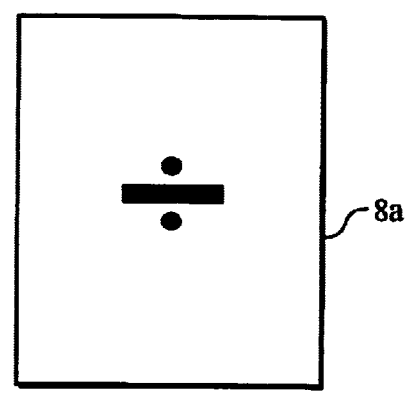
FIG. 4a is a front view of a third embodiment of a question/answer card.
Figure 3B:
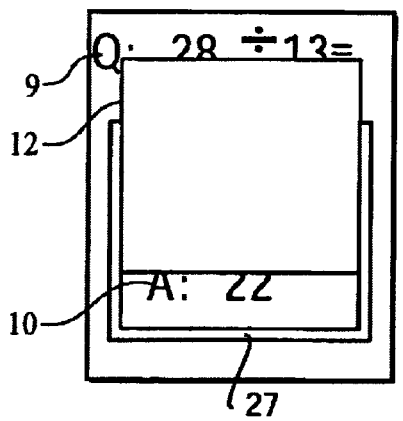
FIG. 3b is a back view of a second embodiment of a question/answer card with the blocking card partially slid upward.
Figure 4B:
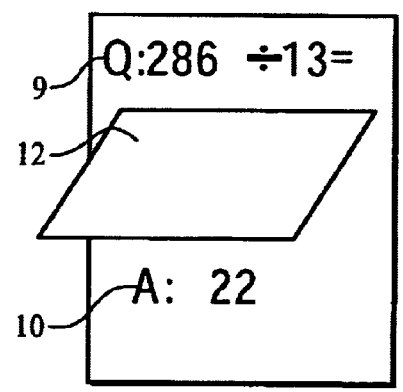
FIG. 4b is a back view of a third embodiment of a question/answer card with the blocking card partially lifted.

FIGS. 3a–3b show a second embodiment of question/answer card 8a. Question 9 is printed on the back of question/answer card 8a, while answer 10 and explanation 11 are hidden behind a blocking card 12. Blocking card 12 can be slid upward in grooves 27 along the sides, and bottom of blocking card 12. If blocking card 12 is only pulled a small distance, it is possible to reveal answer 10 and not explanation 11. This allows the player to continue working on question 9 until answer 10 is reached. FIGS. 4a–4b show a third embodiment of question/answer card 8a. Blocking card 12 is hinged on one of its edges so that it acts as a flap that covers answer 10 and explanation 11 until blocking card 12 is lifted.

Play money 13 is distributed to a player for correctly solving question 9. The amount of money is determined by amount 14 printed on space 4 on which player's marker 6 is situated.

At least one space 4 on game board 2 is labeled with a help category 15. When player's marker 6 lands on this space, the player receives a help card 17. Help card 17 permits that player to ask another player for help in solving question 9. Help card 17 is preferably called a pencil pal card, while space 4 labeled with help category 15 is preferably labeled "pencil pal."

At least one space 4 is labeled with a movement category 17 which corresponds to a deck of movement cards 18. Each movement card 18 instructs a player to move to another space 4, which is identified by a room number 25 on space 4. Movement card 18 is preferably called a hall pass card, while spaces 4 labeled with movement category 17 are preferably labeled "hall pass." Other spaces 4 are labeled with a reward category 19 which correspond to a deck of reward cards 20. Each reward card 20 instructs a player to collect a specific amount of play money 13. Reward card 20 is preferably called a smile card, while spaces 4 labeled with reward category 19 are preferably labeled "smile space." Play path 3 may also include a start space 21, where the players begin the game, as well as free spaces 22 along play path 3. On free space 22 no action is required by the player. Free spaces 22 are preferably labeled "principals office" and "recess."

A mystery category 23 may be labeled on spaces 4, which correlate to a deck of mystery question/answer cards 24. Mystery question/answer cards 24 have questions 9, answers 10, and explanations 11 that relate to any one of mathematical categories 5.

The game is played by assigning marker 6 to each player and having a first player roll die 7. The player then moves marker 6 the amount of spaces 4 indicated on die 7. If marker 6 stops on space 4 that has mathematical category 5, the player selects question/answer card 8a from deck 8 relating to that mathematical category 5. The player cannot see question 9 on question/answer card 8a until it is selected.

The player then reads question 9 from question/answer card 8a and works on a solution to the question in a notebook. The player offers an initial solution to question 9 and then manipulates question/answer card 8a to reveal answer 10. The player compares the initial solution to answer 10.

If the solution and answer 10 match, the player collects play money 13 in amount 14 printed on space 4, and play proceeds to the next player. If the solution and answer 10 do not match, then play proceeds to the next player. However, the first player continues to work on question 9 in notebook 26 until that first player reaches a solution that matches answer 10. This offers the player a chance to correct themselves in answering question 9. The player is motivated to correct the solution if the game is used in a classroom setting and the teacher collects the solutions as an assignment at the end of the game.

If marker 6 stops on space 4 with help category 15, the player takes help card 16 from the deck. Help card 16 is used in asking another player for help in solving question 9, if the player is unable to solve question 9 on their own. Play then proceeds to the next player.

If marker 6 stops on space 4 with movement category 17, the player selects movement card 18 from a respective deck. The player then moves marker 6 to space 4 shown on movement card 18, which is identified by room number 25. Play then proceeds to the next player.

If marker 6 stops on space 4 with reward category 19, the player selects reward card 20 from a respective deck and collects the amount of play money 13 indicated on reward card 20. Play then proceeds to the next player. If marker 6 stops on free space 22, play simply proceeds to the next player.

Play continues with each player rolling die 7, moving their marker 6, and performing a task depending on what space 4 marker 6 lands on along play path 3.

The game ends when a player accumulates a specific amount of play money 13, preferably $20.00. If used in a classroom setting, a teacher may collect all the solutions worked out by the players as an assignment. Thus each player continues working initial solutions that are incorrect, and continually correct themselves, so that the solutions given to the teacher at the end of the game are all correct.

Accordingly, while at least one embodiment of the present invention has been shown and described, it is obvious that many changes and modifications may be made thereunto without departing from the spirit and scope of the invention.

What is claimed is:

1. An educational game for teaching mathematics, comprising:

a game board;

a continuous peripheral play path disposed on said game board and divided into a plurality of contiguous spaces;

a plurality of mathematical categories wherein one of said plurality of mathematical categories is randomly assigned and printed, along with a monetary amount and a room number, on a majority of said plurality of contiguous spaces;

a plurality of individual game markers, wherein each of said plurality of individual game markers identifies a player and marks that player's location on an individual space of said plurality of contiguous spaces of said game board;

a random number generator for determining the number of plurality of contiguous spaces said plurality of individual game markers move during play;

a plurality of card decks, wherein each of said plurality of card decks corresponds to one of said plurality of mathematical categories;

a plurality of question/answer cards in each of said plurality of card decks, wherein each of said plurality of question/answer cards has a front side, a back side, and on which is printed a question, an answer, and an explanation relating to one of said plurality of mathematical categories, and wherein said answer and said explanation can only be viewed after each said plurality of question/answer cards is manipulated by the player;

play money for a player to receive for correctly solving said question on one of said plurality of question/answer card;

a help category labeled on at least one of said plurality of contiguous spaces of said game board; and a deck of help cards labeled with said help category, wherein each help card in said deck of help cards permits the player to ask another player for help in solving said question on one of said plurality of question/answer cards.

2. The educational game for teaching mathematics of claim 1, further comprising:

a movement category labeled on at least one of said plurality of contiguous spaces of said game board;

a deck of movement cards, wherein each movement card of said deck of movement cards instructs a player to move to another of said plurality of contiguous spaces;

a reward category labeled on at least one of said plurality of contiguous spaces of said game board; and a deck of reward cards, wherein each reward card of said deck of reward cards instructs a player to collect a specific amount of said play money.

3. The educational game for teaching mathematics of claim 1, wherein at least one of said plurality of contiguous spaces comprises a space labeled start and at least one free space on said game board.

4. The educational game for teaching mathematics of claim 1, wherein said plurality of mathematical categories comprise addition, subtraction, multiplication, division, money, story problems, fractions, and time.

5. The educational game for teaching mathematics of claim 1, further comprising:

a mystery category labeled on at least one of said plurality of contiguous spaces; and a deck of mystery question/answer cards, wherein each mystery question/answer card of said deck of mystery question/answer cards has a question, an answer, and an explanation that relates to any one of said plurality of mathematical categories.

6. The educational game for teaching mathematics of claim 1, further comprising a plurality of holding envelopes each holding one of said plurality of card decks, wherein only said mathematical category of said plurality of question/answer cards can be viewed by a player when said plurality of question/answer cards are within said plurality of holding envelopes.

7. The educational game for teaching mathematics of claim 6, wherein each of said plurality of question/answer cards have said question on said front side and said answer and said explanation on said back side, and wherein said manipulation by the player is flipping over said question/answer card.

8. The educational game for teaching mathematics of claim 1, further comprising a blocking card coupled to each of said plurality of question/answer cards, wherein said blocking card has a top side, a bottom side, a left side and a right side, wherein said blocking card prevents the player from viewing said answer and said explanation, and wherein said manipulation by the player is the movement of said blocking card.

9. The educational game for teaching mathematics of claim 8, further comprising a plurality of grooves disposed on each of said plurality of question/answer cards, wherein said plurality of grooves hold said blocking card on said question/answer card and run along said left, right and bottom sides of said blocking card.

10. The educational game for teaching mathematics of claim 8, wherein one of said sides of said blocking card is coupled to said question/answer card, so that said blocking card may be lifted from said question/answer card in a hinged motion.

11. The educational game for teaching mathematics of claim 1, further comprising notebooks in which the players work out solutions to said questions from said plurality of question/answer cards.

12. A method of playing an educational game for teaching mathematics comprising the following steps:

providing a game board having a continuous peripheral play path divided into a plurality of contiguous spaces, with a majority of said plurality of contiguous spaces labeled with a mathematical category and monetary amount;

actuating a random number generation means for determining the number of said plurality of contiguous spaces for a player to move their marker;

selecting a question/answer card relating to said mathematical category listed on one of said plurality of contiguous spaces, when that player's marker stops, after being advanced, on one of said plurality of contiguous spaces labeled with said mathematical category;

reading a question from said question/answer card;

offering an initial solution to said question on said question/answer card;

manipulating said question/answer card so that an answer printed on said question/answer card is revealed;

comparing said initial solution to said answer provided on said question/answer card;

collecting play money in said amount printed on one of said plurality of contiguous spaces when said initial solution matches said answer provided on said question/answer card;

selecting a help card when that player's marker stops on one of said plurality of contiguous spaces labeled with a help category; and using said help card to ask another player for help in solving said question, if the player is unable to find the solution to said question on their own;

wherein play continues to the next player after the original player has completed the action required by the one of said plurality of contiguous spaces their marker stopped on, and wherein the play of the game is terminated when a player accumulates a specified amount of play money.

13. The method of playing an educational game for teaching mathematics of claim 12, further comprising the steps of:

continuing to work on a second solution to said question during other players' turns if said initial solution did not match said answer; and providing all solution reached through the course of the game to a teacher as an assignment.

14. The method of playing an educational game for teaching mathematics of claim 12, further comprising the steps of:

selecting a movement card if that player's marker stops on one of said plurality of contiguous spaces labeled with a movement category;

moving that player's marker to one of said plurality of contiguous spaces shown on said movement card, identified by a room number;

selecting a reward card when that player's marker stops on one of said plurality of contiguous spaces labeled with a reward category; and collecting an amount of play money indicated on said reward card.

15. The method of playing an educational game for teaching mathematics of claim 12, further comprising the step of:

working out the solution to said question from said question/answer card in a notebook.

* * * * *